United States Patent [19]

Simic-Glavaski et al.

[11] Patent Number: 5,356,646
[45] Date of Patent: Oct. 18, 1994

[54] ELECTRON SOURCE COOKING METHOD

[76] Inventors: Branimir Simic-Glavaski, 2481 Edgehill Rd., Cleveland, Ohio 44106; Michael G. Simic, 9404 Bac Pl., Gaithersburg, Md. 20877

[21] Appl. No.: 986,389

[22] Filed: Dec. 7, 1992

[51] Int. Cl.$^5$ .............................................. A23L 1/00
[52] U.S. Cl. .................................. 426/237; 426/244; 426/523
[58] Field of Search .................... 426/237, 244, 523; 99/358, DIG. 14; 219/10.81

[56] References Cited

U.S. PATENT DOCUMENTS

| | | | |
|---|---|---|---|
| 1,044,201 | 11/1912 | Lincoln | 426/237 |
| 2,304,958 | 12/1942 | Rouy | 219/10.81 |
| 2,310,690 | 2/1943 | Griffith | 99/358 |
| 2,400,951 | 5/1946 | Reid | 426/237 |
| 2,485,660 | 10/1949 | Robertson | 219/10.81 |
| 3,230,096 | 1/1966 | La Vine | 426/244 |
| 4,386,110 | 5/1983 | Komeyasu et al. | 426/237 |
| 4,739,140 | 4/1988 | Reznik | 426/244 |
| 4,980,530 | 12/1990 | Butot | 99/358 |

FOREIGN PATENT DOCUMENTS 615910 6/1978 U.S.S.R. ............................ 426/244

OTHER PUBLICATIONS

Mutation Research, Jun 1992, vol. 267, No. 2, Completing vol. 267, International journal on mutagenesis, chromosome breakage and related subjects.
American Chemical Society, 1992, Chapter 18, pp. 310–321, "Effect of Lipid Oxidation on Oil and Food Quality in Deep Frying", Perkins.
ACS Symposium Series 500, American Chemical Society, Aug. 25–30, 1991, "Lipid Oxidation in Food", Angelo, Editor, Vercellotti et al.
American Chemical Society 1992, Chapter 2, Simic et al. "Mechanisms of Lipid Oxidative Processes and Their Inhibition", pp. 14–33.
Cancer Research 51, 3075–3079, Jun. 15, 1991, Loeb, "Mutator Phenotype May Be Required for Multistage Carcinogenesis[1]".
Review, Cancer Cells, Jan. 1991, vol. 3, No. 1, Cerutti et al. "Inflammation and Oxidative Stress in Carcinogenesis" pp. 1–7.
"Antioxidant Vitamins and B–Carotene in Disease Prevention", Proceedings of a conference held in London, UK, Oct. 2–4, 1989, 4 pages.
Mutation Research, 267 (1992) 277–290, MUT00315, Simic, "Urinary biomarkers and the rate of DNA damage in carcinogenesis and anticarcin. . . ".

*Primary Examiner*—George Yeung
*Attorney, Agent, or Firm*—Renner, Otto, Boisselle & sklar

[57] ABSTRACT

A cooking apparatus and method supplies a source of electrons to food contained in a vessel or in contact with a grill and cooked by thermal processes to reduce the carcinogenic effect of electron-depleted food which results from thermal excitation and oxidation of thermal cooking processes.

9 Claims, 1 Drawing Sheet

ELECTRON SOURCE COOKING METHOD

FIELD OF THE INVENTION

The present invention relates generally to control and diminishment of cooking-induced carcinogenic effect of food cooked by thermal processes.

BACKGROUND OF THE INVENTION

Cancer is a complex, multifactorial disease induced by exogenous damaging agents and endogenous metabolic processes (1, 2). Of particular interest in the study of carcinogenesis are oxidative processes (2, 3). Ingested externally generated oxidative products are known to be carcinogenic. In general, it is estimated that diets and foods contribute to about one third of all incidences of cancer and cardiovascular disease.

Deep frying is a frequent method of food preparation, especially in fast food businesses, due to popularity of fried foods. Oxidation of frying oil at high temperatures generates numerous oxidative products, some of which have undesirable effects on food quality and safety (4, 5). Oxidation of fats and oils in deep frying is mediated by free radical processes (5) which potentlate (amplify) decomposition through chain propagation (6). Oxidative chain propagation, however, is preventable by antioxidants (6).

Hence, application of antioxidants could be used to control the extent of oxidation, i.e., oxidative decomposition of frying oils, extending the usable lifetime and reducing the potential toxicity of oils. Antioxidants, in general, are known to have anticarcinogenic properties (7, 8), as well as preventers of cardiovascular diseases (8), due to suppression of oxidative processes (8).

Propagation cation of a chain reaction occurs by the reaction of peroxy radicals with a lipid molecule $$HLOO + H_2L \rightarrow HLOOH + HL$$

This chain reaction can be inhibited by electron donation either by an electrode or antioxidant $$HLOO + e^- \rightarrow HLOO^-$$

$$HLOO^- + H \rightarrow HLOOH.$$

Chain reactions in oxidation of fats and oils during frying and deep frying of foods are propagated by oxy radicals. Chain reactions can be inhibited by neutralization of oxy radicals. Oxy radicals can be neutralized by electrochemical or chemical electron donation. Consequently, the rate and extent of oxidation can be controlled to a great degree in order to optimize the flavor, extend the lifetime of oils, and reduce formation of potentially toxic products.

References:
1. Loeb, L. A., Mutator phenotype may be required for multistage carcogenesis, Cancer Res. 51, (1991), 3075.
2. Cerrutti, P. A. and Trump, B. F., Inflammation and oxidative stress in carcinogenesis, Cancer Cells, 3, (1991), 1.
3. Simic, M. G., Urinary biomarkers and the rate of DNA damage in carcinogenesis and anticarcinogenesis, Mut. Res. 267, (1992), 277.
4. St. Angelo, A. J. (Ed), Lipid Oxidation in Food, American Chemical Society Symposium Series 500 (1992).
5. Perkins, E. G., Effect of lipid oxidation in oil and food quality in deep frying, American Chemical Society Symposium Series 500, (1992), 310.
6. Simic, M. G., Javanovic, S. V., and Niki, E., Mechanism of lipid oxidative processes and their inhibition, American Chemical Society Symposium Series 500, (1992), 14.
7. De Flora, S., Special Issue Mutt. Res. 267, (1992).
8. Slater, T. F., and Block, G. (Ed), Antioxidant Vitamins and b-Carotene in Disease Prevention, Am. J. Clinical Nutrition, 53, (1992), 1.

SUMMARY OF THE INVENTION

The present invention provides an apparatus and method for cooking food in the presence of a source of electrons to maintain and supplement the electron content of the food.

An objective of the present invention is to reduce cancer risks during food preparation. Another objective is to improve cookwares that are cancer risk reducers. An additional objective is to provide food additives that can reduce cancer risks.

In accordance with one aspect of the invention, a method of cooking electron-enriched food is provided wherein an electron source is provided in connection with a cooking utensil such as a pot or other cooking vessel so that as food is cooked by a thermal process the electron source replenishes or increases the electron content of the food being cooked.

In accordance with another aspect of the invention, a cooking utensil is provided for containing food during a cooking process, wherein the cooking utensil includes a source of electrons for introduction to food matter contained within the utensil.

In accordance with another aspect of the invention a grilling apparatus is provided which includes electrically conductive crosspieces and an electrical current generated to pass through the crosspieces to provide a source of electrons to food placed on the crosspieces of the grill.

In accordance with another aspect of the invention a method for cooking food without depleting the electron content of the food is provided wherein food is placed in a cooking medium contained in a volumetric body and an electric current is applied to flow through the cooking medium to provide free electrons for absorption by the food during a thermal cooking process.

In accordance with still another aspect of the invention a method for cooking food in a cooking medium without substantially depleting the electron content of the food is provided wherein an antioxidant is added to the cooking medium during a thermal cooking process to control oxidation of the food being cooked.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF PREFERRED EMBODIMENTS

The present invention contemplates several embodiments and equivalents which enable efficient maintenance and supplementation of electron content of food prepared within a utensil or vessel by a thermal cooking process.

Figure 1:
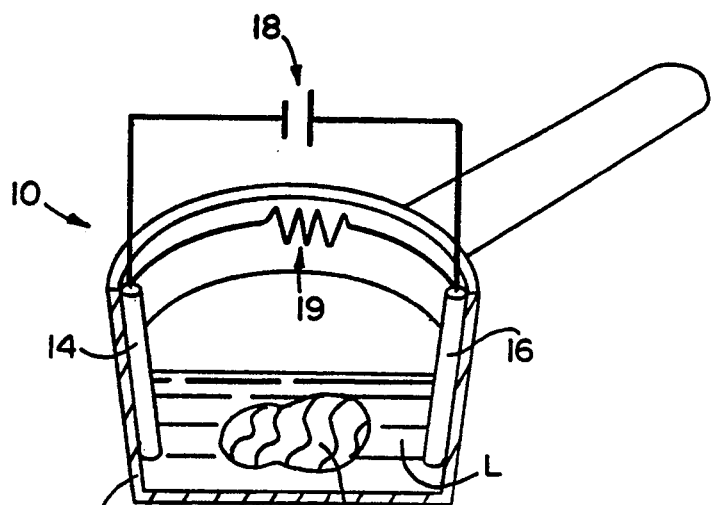
FIG. 1 illustrates an embodiment of a cooking utensil in accordance with the present invention.

With reference to FIG. 1, a cooking apparatus 10 includes a vessel 12 having sufficient volume to contain food material F to be cooked and a quantity of liquid or other medium L which is, e.g., water, sauce or other liquid used in a boiling, steaming or basting or other cooking process. The vessel 12 may be a variety of cooking vessels; non limiting examples include a pot, skillet, kettle, dish, bowl, etc. If the vessel is metal or other electrically conductive material, it may be electrically insulated with an appropriate coating, etc.

An anode 14 and a cathode 16 are positioned in the interior of the vessel 12 and connected to a controllable variable external current source 18 to create a current and electron flow within the liquid L in which the food matter F is cooked or heated. Also anode 14 and cathode 16 can be made of metals like copper or zinc which, when connected by a resistive element 19, form a primary electrochemical battery. The electrodes 14 and 16 also form a natural electrochemical potential when placed in an electrolyte. (Hereinbelow reference is made to cooking foods, but the invention also can be used while heating or otherwise treating foods.) The source 18 may be a battery, a connection to a conventional electrical outlet preferably via a low voltage transformer, or other source of electric energy, preferably electrons.

As current flows from anode 14 to cathode 16, an opposite flow of electrons through cooking medium L provides an electron source for absorption by food F. Excess electrons flowing from anode 14 to cathode 16 are absorbed by food matter F to replace electrons lost by thermally-induced oxidation, and further to result in electron enriched food at the end of the cooking process. The vessel 12 can itself serve as an anode or cathode.

Figure 2:
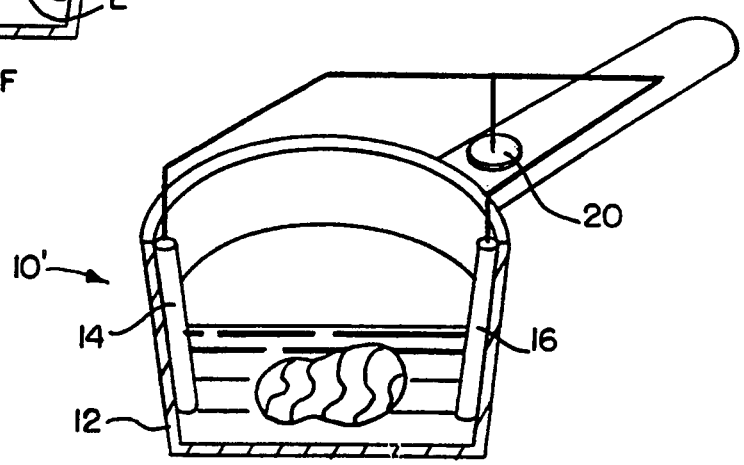
FIG. 2 illustrates another embodiment of a cooking utensil in accordance with the present invention.

FIG. 2 illustrates an alternate embodiment of a current generating cooking apparatus 10' wherein a current source to anode 14 and cathode 16 is provided by a solar cell 20 mounted integrally upon the cooking utensil 12. In this embodiment, solar cell 20 can produce a current of, for example, five microamps to five hundred nanoamps sufficient to provide an adequate source of electron flow which can be absorbed by the food being cooked to maintain or supplement the electron content of the food. An advantage to this embodiment is the availability of ambient energy to replace or to supplement the battery or other source.

Figure 3:
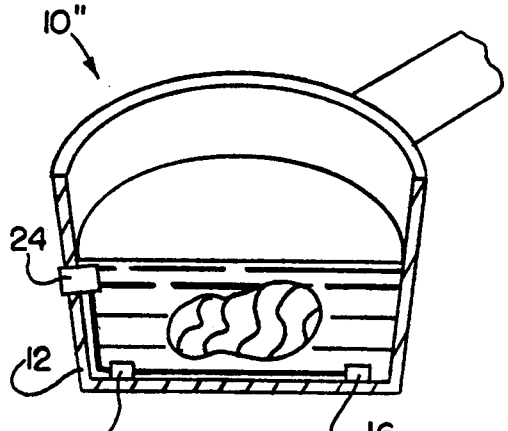
FIG. 3 illustrates another embodiment of a cooking utensil in accordance with the present invention.

FIG. 3 illustrates another embodiment of the cooking apparatus 10" of the invention wherein an electron source is provided within vessel 12 by a thermocouple 24 which produces a thermally induced current between anode 14 and cathode 16. In such an embodiment, the terminals of thermal couple 24 can be optimally positioned at any suitable location upon vessel 12 to be subject to and sense a temperature difference sufficient to produce a current of adequate amperage between anode 14 and cathode 16. An advantage to this embodiment is the availability of energy from the cooking heat source without need for a battery (or other supply) or to supplement that supply.

Figure 4:
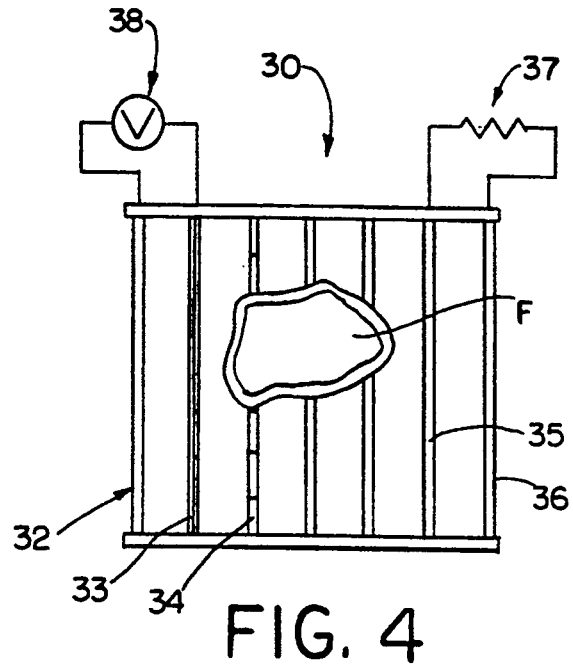
FIG. 4 illustrates another embodiment of a grilling apparatus in accordance with the present invention.

FIG. 4 illustrates another embodiment of the invention as applied to a grill apparatus, indicated generally at 30. The electron enrichment of food F cooked by a grilling process upon a grill 30 supported over a charcoal, gas or electric heat source can be accomplished by making the crosspieces 32 of the grill 30 electrically conductive as anodes and cathodes. For example, crosspiece 35 can be made of or contain zinc, and crosspiece 36 can be made of or contain copper, and the two conductively connected by a resistive element 37. Also, a single crosspiece such as 33 or 34 can be made to contain, for example, both copper and zinc in adjacent arrangement such as parallel along the entire length of the crosspiece as in crosspiece 33 or in alternating sections of the length of the crosspiece as in crosspiece 34, with resistive connections between the different sections. As food F is placed upon the grill 30, a circuit between crosspiece 35 and crosspiece 36 is completed whereby an anodic-cathodic reaction is induced between the cuprous anodic crosspiece 36 and the zinc cathodic crosspiece 35. The flow of electrons in such reaction is through food F, which is in direct contact with crosspieces 35 and 36, to provide an electron source for replenishing electrons lost during the grilling process. Alternatively, the crosspieces 32 of grill 30 can be made of any electrically conductive material and connected to a voltage potential 38 to provide an electron flow through any food F placed on and in contact with the grill.

In each of the described embodiments, the anode and cathode may be separate electrodes connected by the illustrated electrical connections to the respective sources of electrons. Alternatively, the anode and/or cathode may be actual parts of the cooking utensil such as metal or other material of which the utensil is made. The electrodes should be placed in such a way as not to short circuit without supply electrons to the food.

The invention provides an electric field between the electrodes so that current will flow. Therefore, the food tends to be cooked in a reducing medium rather than in an oxidizing medium; or at least the extent of oxidation is reduced. Thus, the tendency for the cooked food to be carcinogenic is diminished.

The invention may be built into the cooking utensil or it may be a separate add-on device that is used with the utensil. In the later case, the electrodes can be inserted into the pot or other utensil; and some mounting means would be provided for those electrodes, the connections between them, and the source of electric energy. Portions may be incorporated into the cooking utensil as an integral part thereof; in such case it may be that the electrodes or one of them is/are an integral part of the cooking utensil, and the source of electric energy is a separate component that is mounted on or is spaced away from or even is an integral part of the utensil.

Chemical electron donation can be accomplished in accordance with the invention by, for example, the use of thermally labile natural and/or man-made compounds, either isolated or in the bulk (natural food) matrix, which release antioxidants upon thermal excitation to provide a source of electrons.

Antioxidants, being good electron donors, are excellent inhibitors of oxidative chain reactions. For example, sesame oil contains sesamolin, which is known to be converted into sesamol upon heating. Sesamol is a potent antioxidant. Thus, continuous addition of controlled quantities of sesame oil to deep-frying cooking oils during a food cooking process can control the oxidative process (oxy radical chain reactions). A longer lifetime and lowered toxicity level of deep-frying cooking oils is consequently achieved by this method of chemical electron donation.

Although the invention has been described with reference to several embodiments, it will be appreciate that other embodiments within the scope of the invention are possible which similarly produce the desired flow of excess electrons within a cooking medium as part of a cooking utensil. Similarly, and also within the scope of this invention, are embodiments wherein an apparatus which provides a source of excess electrons is separate from but adapted for use in connection with a cooking utensil. All such embodiments are contemplated by the present invention the scope of which is limited only by the following claims.

We claim:

1. A method of cooking food without depleting the electron content of said food comprising the steps of,
placing the food within a cooking medium containing a volumetric body, and
applying a low voltage DC electric current, of sufficient magnitude to create a reducing environment, to flow through said cooking medium to provide said reducing environment in which the food is cooked, said applying comprising supplying free electrons for absorption by said food during a thermal cooking process, such that the tendency for the cooked food to be carcinogenic is diminished.

2. The method of claim 1 wherein said cooking medium is in a liquid state.

3. The method of claim 1 wherein said electric current is provided by an electric circuit integrally attached to said volumetric body.

4. The method of claim 1 wherein said electric current is provided by a solar cell.

5. The method of claim 1 wherein said electric current is provided by a thermalcouple.

6. In a method of cooking food using a thermal cooking process, the improvement comprising during the cooking of the food supplying the food with electrical input that provides the food with an excess of electrons, said supplying comprising using electrodes to couple low voltage DC electrical energy, of sufficient magnitude to create a reducing environment, to the food or medium in which the food is cooked to supply the excess electrons.

7. In the method of claim 6, the improvement further comprising supplying the food with electrons while simultaneously cooking the food for eating.

8. In the method of claim 6, wherein said using electrodes comprises placing the food into engagement with the electrodes.

9. In the method of claim 8, wherein said placing comprising using the food to complete a circuit between electrodes.

* * * * *